United States Patent

Johnson

[11] Patent Number: 5,449,224
[45] Date of Patent: Sep. 12, 1995

[54] LEVERED GRAVITY-ASSISTED SIDE DUMP CART

[76] Inventor: Kent H. Johnson, 521 Hawthorne Ave., Los Altos, Calif. 94024

[21] Appl. No.: 104,361

[22] Filed: Aug. 9, 1993

[51] Int. Cl.6 ............................................. B62B 3/00
[52] U.S. Cl. ......................................... 298/2; 298/18; 280/47.34
[58] Field of Search ............................ 298/2, 17.6, 18; 280/47.34, 47.371, 47.131

[56] References Cited

U.S. PATENT DOCUMENTS

| | | | |
|---|---|---|---|
| 3,256,539 | 2/1966 | Ketterer | 280/47.371 |
| 3,281,186 | 10/1966 | Davis | 298/2 |
| 4,398,768 | 8/1983 | Parks et al. | 298/2 |
| 5,249,823 | 10/1993 | McCoy et al. | 280/47.34 |

FOREIGN PATENT DOCUMENTS

| | | | |
|---|---|---|---|
| 791239 | 12/1935 | France | 298/2 |
| 708479 | 6/1966 | Italy | 298/2 |

*Primary Examiner*—Michael S. Huppert
*Assistant Examiner*—Gregory A. Morse

[57] ABSTRACT

A levered, gravity-assisted, side dump utility cart for transporting and dumping objects and materials has load carrying apparatus, bedframe, a rear carriage, a 360 degree rotatable front carriage, four wheels, and towbar unit. A towbar is used as a lever against underside regions of the bedframe by the operator for manually dumping of loads from either side of the cart. Proximate maximum gravity assistance for levered dumping is obtained by unique and predetermined wheel alignments for each selected embodiment of the side dump cart. For such levered dumping, dump alignment devices define the towbar positions where the proximate maximum gravity assistance is obtained for dumping the load with proximate minimum upward and horizontal force on the towbar lever. The range of selectability and the extent of gravity assistance available to the operator for dumping the cart is determined by the embodiment of this invention. A gravity stable position of the cart in a dumped position enables rotation of the cart away from the dumped load. For stowage of the cart and for handling of the stowed cart, a compact stowed configuration which constrains the motion of the towbar and the front carriage is provided.

8 Claims, 4 Drawing Sheets (shown with items 8 and 32 cutaway)

LEVERED GRAVITY-ASSISTED SIDE DUMP CART

BACKGROUND—FIELD OF THE INVENTION

The present invention relates to load carriers for the transport and manual off-loading of objects and materials, and more particularly to side dump carts utilizing gravity assistance and manual levering in the load dumping process.

BACKGROUND—DESCRIPTION OF PRIOR ART

The tree service industry produces large quantities of brush, tree limbs and heavy logs in the removal and trimming of trees in backyards of homes and other similarly confined, inclined, or rough surface areas. Such tree products must be transported some distance and deposited near large equipment such as brush chippers and trucks which often cannot enter confined areas, rough or soft surface areas, inclined terrain, or cultivated areas. Movement of such materials is commonly done by using wheelbarrows, tarpaulins, common four-wheel dollies, and non-dumping carts designed for other functions and by dragging or carrying segments of tree limbs and logs. Such transport methods are time consuming and inefficient, and are even more physically exhausting to tree service personnel when the transported material must be manually lifted from the transport vehicle and deposited at the terminal location. Similarly, construction, agricultural, landscaping, manufacturing and other industries commonly transport and manually off load objects using labor intensive, inefficient, and thus expensive techniques.

The closest prior art invention known to the inventor is U.S. Pat. No. 4,398,768 for a SIDE DUMP CART issued Aug. 16, 1983. That cart is described in the patent by the inventor as being in the field of movement of lengths of pipe and of steel in various forms and other objects between locations in a manufacturing plant and from plant to truck or from truck to plant. That cart off-loads only on one side and has no mechanisms for the use of a lever by the operator in the load dumping process. It has no provisions for load constraints on the off-load side and normally travels on smooth, hard support surfaces, sometimes with only two wheels in contact with the support surface. It is designed to be manually pushed and guided from a handle at the side of the cart such that the applied force to move the cart is not in a direction through, below, or above the center of mass of the cart and its load. This latter feature would make that cart with heavy loads difficult or impractical to push or pull on rough or soft surfaces such as often found in outdoor lawns, gardens, utility yards, and construction sites. That cart has no provisions to change the contours of the cart for compact storage or for reducing the space required to transport the cart from one jobsite to another. Furthermore, that cart having a platform that is free of obstructions to the falling of loads from the off-load side and being able to dump from only one side would be inefficient for hauling and dumping large loads of brush, logs, and other bulk material.

OBJECTS AND ADVANTAGES

It is, therefore, an object of this invention to provide a dual side dump utility cart which can embody various load beds, sideboards and load poles, which permits load transport to be achieved with good stability on smooth or rough surfaces, and which enables the load on the cart to be manually dumped with a combination of manual lever action and gravity assistance so that off-loading is obtained with minimal labor costs and practical levels of manual force on the lever.

It is another object of this invention to provide for the manual use of the cart towbar as the lever to dump the load from either side of the cart. Such lever action permits large and heavy loads to be off-loaded quickly and efficiently by a single operator.

It is a further object of this invention to provide for adjustments to the length of the towbar thereby enabling the operator to adjust the towbar leverage available to dump the load from the cart, to adjust the height of the towbar handle above the support surface for the cart at the initiation of the dumping action to better match the height or other physical characteristics of the operator and to adjust the position of the handle in the stowed position of the cart for more effective handling, stowage, or shipping of the cart.

It is a further object of this invention to provide for specific axes of rotation in the load dumping operations by selecting specific wheel alignments such that the proximate maximum gravity assistance for dumping loads from the cart is obtained and the proximate minimal upward force and proximate zero horizontal force is required on the towbar handle by the operator to dump loads from the cart. These wheel alignments enable a single operator to quickly and safely dump heavy loads with less effort and less subsequent exhaustion.

It is another object of this invention to provide selectability for the load-produced and cart-produced gravity assistance to the manually levered dumping of the cart. The magnitude of the gravity assistance can be operator selected or can be application specific in particular embodiments of the invention thereby enabling the performance of the cart to be tailored to specific applications and to the physical capabilities of the operator.

It is another object of this invention to provide for physically defined positions on the underside region of the cart at which the operator places the towbar to initiate the dumping of loads from the cart with the proximate minimal upward and horizontal forces on the towbar handle. This structural constraint enables the operator to quickly and effectively rotate the towbar to the near optimum position to initiate the dumping of the cart.

It is a further object of this invention to provide for a dumped position of the cart which is gravity stabilized by having the two front wheels, the off-load-side rear wheel, and the off-load-side front bedframe corner in contact with the supporting surface. This gravity-stable cart configuration in the dumped position enables the operator to rotate the cart on the front two wheels and the bedframe corner proximately circularly around the surface-contacting rear wheel. Thus, the operator can substantially, quickly, and easily move the cart away from the dumped load by manually pulling on the cart towbar.

It is an object of this invention to provide for high maneuverability of the cart in the transport mode by providing for more than 270 degrees of rotation of the towbar and front carriage assembly about the vertical bedframe axle, thus enabling effective use of the cart in confined areas.

It is a further object of this invention to provide for a compact configuration of the cart to minimize space required for storage.

It is a further object of this invention to provide for a towbar shape that facilitates rotation of the towbar to dump initiation positions under the cart bedframe with only moderate bending or stooping by the cart operator, thereby reducing the physical exhaustion of operators.

It is a further object of this invention to provide for a towbar attachment device on the rear carriage assembly so that the towbar and its attached handle can be used to facilitate the lifting and moving of the cart in the stowed position and to restrict, for safety reasons, the possible motions of the towbar assembly and the front carriage assembly during handling and hauling operations in the stowed position.

SUMMARY

The levered, gravity-assisted, side dump cart enables an operator to transport loads and then remove the loads from the cart by dumping the loads from either side of the cart. The cart towbar is used as a lever against the underside of the cart in the load dumping process. For such levered dumping, dump alignment devices define unique towbar positions on the cart where the proximate maximum gravity assistance is obtained for dumping the load with proximate minimum upward and horizontal forces on the towbar lever. A range of towbar leverages and gravity assistance capabilities is available to the operator in different embodiments of this invention. A gravity stable position of the cart is obtained in the dumped position and enables the operator to easily rotate the cart away from the dumped load without significant interference from the dumped load. For stowage of the cart and for handling the stowed cart, a compact stowed configuration which includes a constraint on the motion of the towbar unit and the front carriage is provided.

DESCRIPTION OF THE INVENTION

Figure 1:
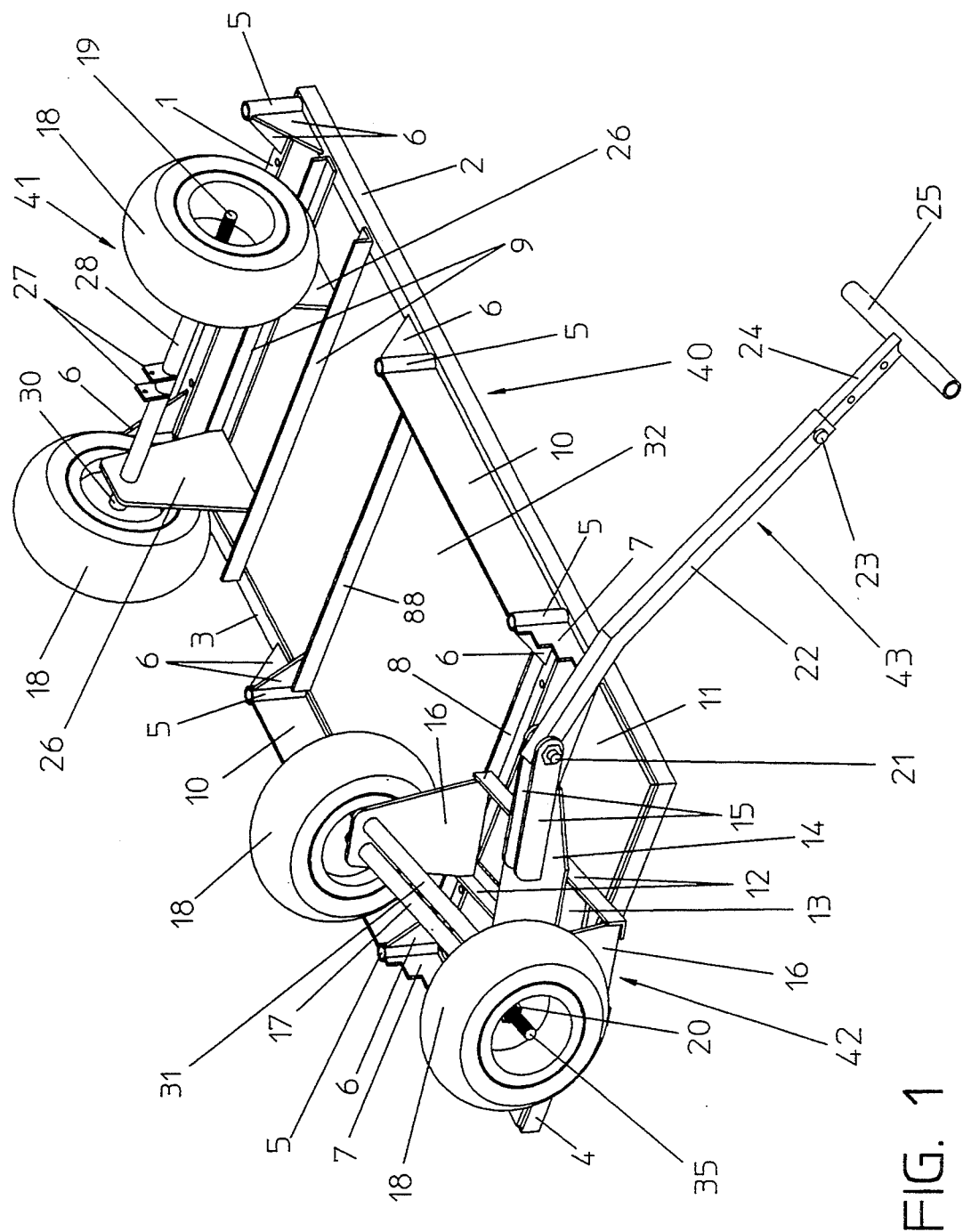
FIG. 1 is a perspective view of the underside of the invention for an embodiment with a dual front axle housing.
Figure 2:
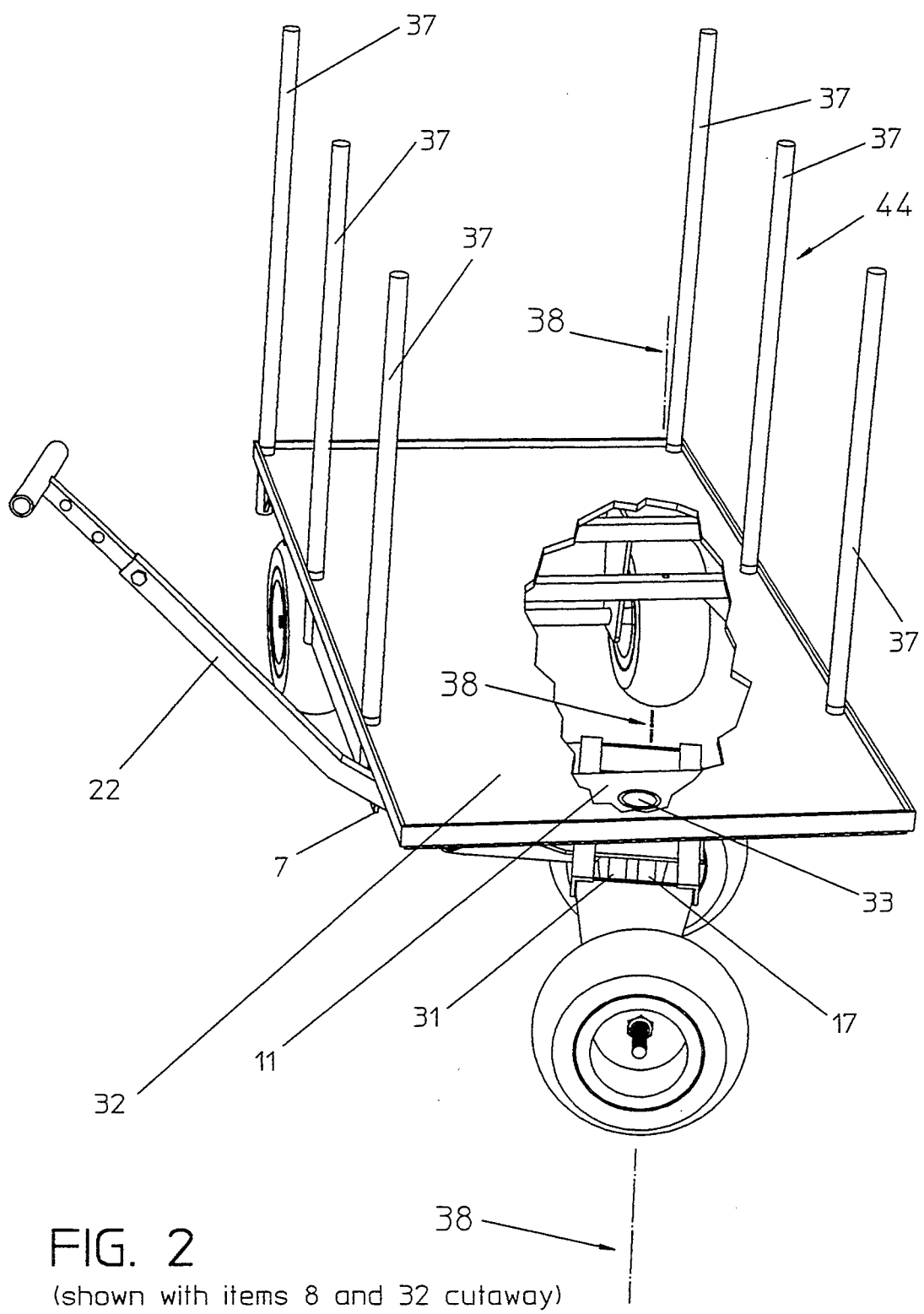
FIG. 2 is a perspective view of the topside of the invention with a cut-away load bed to illustrate the wheel alignment and axis of rotation in the dump initiation position.
Figure 3:
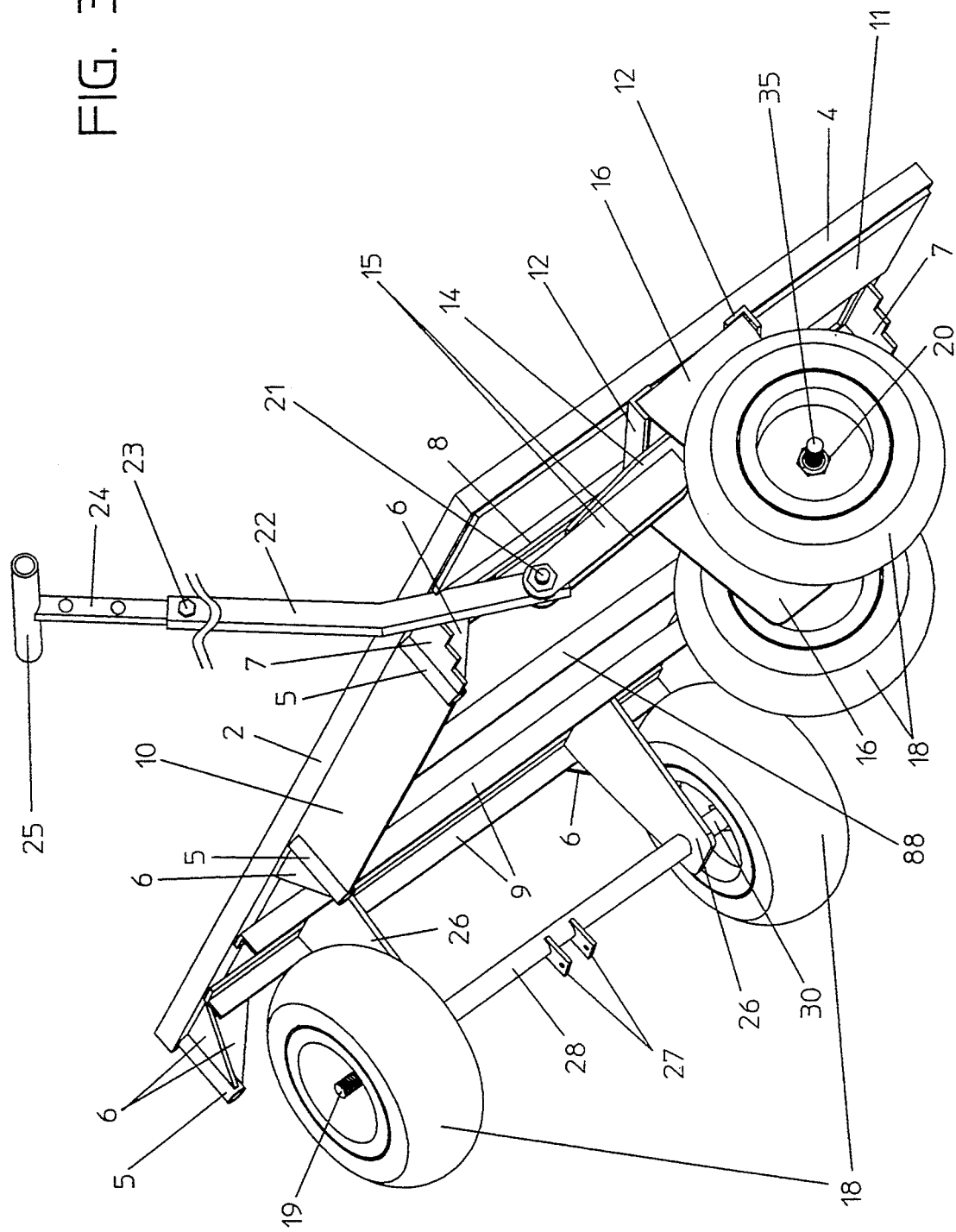
FIG. 3 is a perspective view of the invention in the stable dumped position.

A typical embodiment of the present invention is shown by the perspective drawings in FIG. 1-3 for understanding the basic elements of the levered, gravity-assisted side dump cart. The principal sub-assemblies illustrated in these drawings, show the bedframe, 40, rear carriage 41, front carriage 42, the towbar unit 43, and load carrying apparatus 44.

The bedframe 40 comprising in the cart embodiment shown in FIG. 1-3 a front-center support angle iron 8 with attachment holes, a rear-center support angle iron 88, a left side angle iron 2, a rear angle iron 1 with attachment holes for load beds, a right side angle iron 3, a steel frameplate 11 with a hole to accept the vertical bedframe axle 33, a front angle iron 4, two sideplates 3 primarily for strengthing the side angle irons 2 and 3 but also to strengthen the attached internally open load constraint receptacles 5, steel triangular plates 6 to strengthen the load constraint receptacles 5. The elements of the bedframe are welded together in this embodiment to provide structural strength for heavy load items dropped onto the attached detachably load bed 32 and to sustain structural integrity for the torque forces developed on the bedframe during the load dumping process.

The rear carriage assembly includes the support angle irons 9 which are welded to the bedframe 40 and to the rear axle plates 26. A rear axle housing 28 is rigidly welded to the rear axle plates for structural strength and supports the rear axle 19. Removable wheel spacer segments 30 which are supported by the rear axle establish in part the spacing between the rear wheels and may be removed by the operator to decrease the rear wheel separation and thereby to increase the extent of gravity assistance in the levered load dumping process. The rear wheels 18 are supported by rear axle 19.

Towbar lock tabs 27 are welded to the rear axle housing 28.

The front carriage 42 comprises the carriage plate 13 rigidly mounted to the front carriage angle irons 12, the front axle plates 16, two front axle housing 17 and 31, front axle 35, two axle nuts 20, two front wheels 18, a towbar attachment plate 14, and two towbar straps 15. The vertical frame axle 33 seen in FIG. 2 extends through a hole in the carriage plate 13 and is coupled to it.

The towbar unit 43 comprises the non-linear towbar 22, the slide bar 24, the handle 25, and coupling pin 23. The towbar unit is movably attached to the front carriage by coupling pin 21.

The two dump alignment devices 7 physically establish appropriate positions for the operator to place the towbar 22 to initiate the side dumping of loads from the cart. The selected position depends on the operator-selected locations of the front axle 35 and the wheel spacer segments 30.

Load carrying apparatus 44 illustrated in FIG. 2 includes six detachably attached load poles 37 and a load bed 32.

The gravity stable dumped position for the cart with the two front wheels, the off-load-side rear wheel, and the off-load-side front corner of the bedframe in contact with the support surface for the cart is illustrated in FIG. 3.

Figure 4:
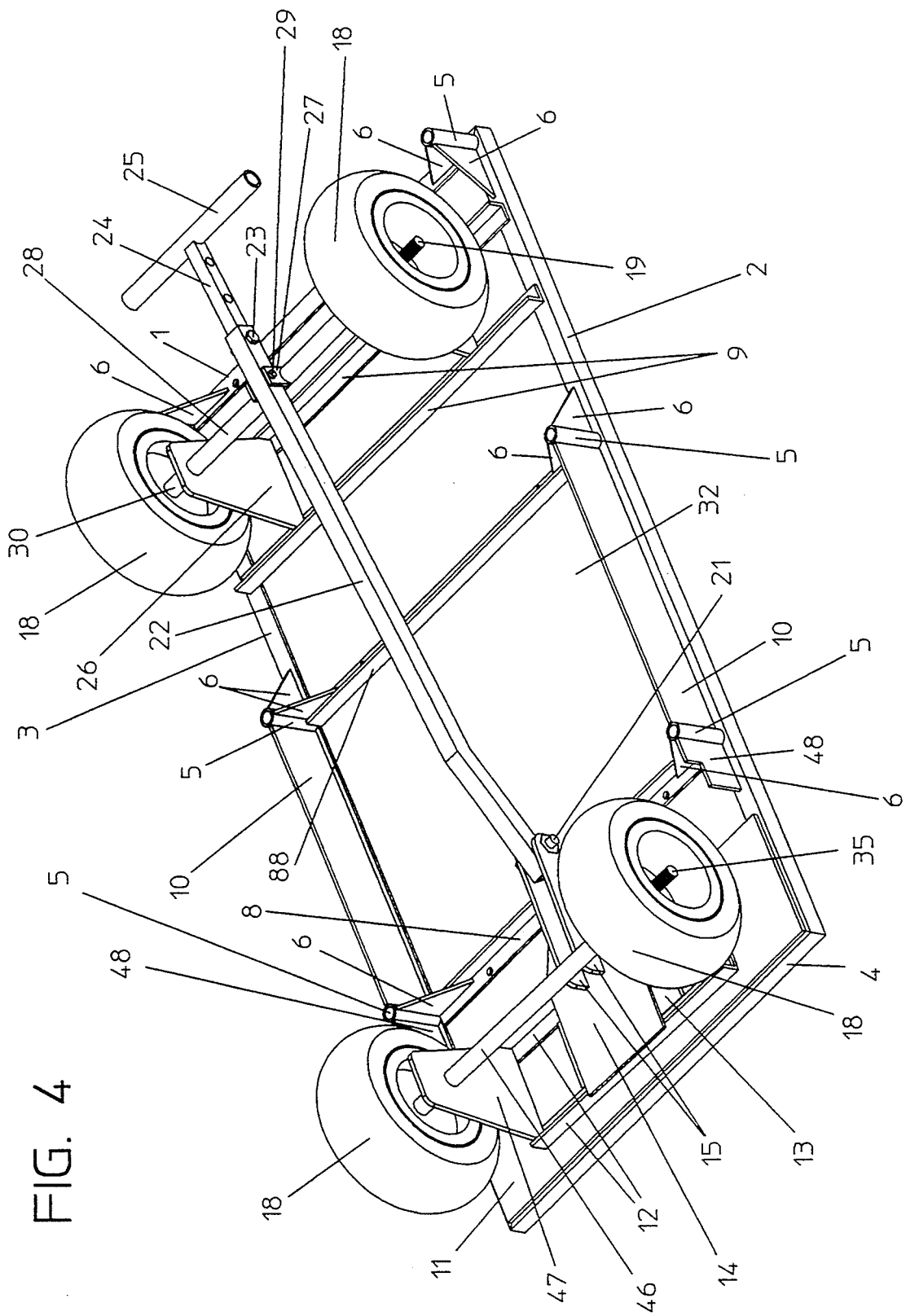
FIG. 4 is a perspective view of another embodiment of the invention with a single front axle housing and two-position dump alignment devices.

A different embodiment of the present invention is shown by a perspective drawing in FIG. 4. In this embodiment, a single front axle housing 46 is used. Two-position dump alignment devices 48 are attached to establish the dump alignment positions for the towbar corresponding to the rear wheel positions that the operator can select by retaining or removing the rear wheel spacer segments 30. FIG. 4 also shows the towbar 22 in the stowed position and attached to the towbar lock tabs 27 by the lock-tab pin 29.

OPERATION OF THE INVENTION

Many of the features related to the operation of this invention may be understood with reference to the embodiments of the cart shown in FIG. 1 and FIG. 2. After load material on the cart is transported by the operator to the location where the material is to be dumped from the cart, the cart poles 37, as seen in FIG.

2, are removed from the off-load side of the cart by the operator. The non-linear towbar 22 is rotated away from the off-load side to contact the designated position on the dump alignment device 7 for the selected cart configuration. This action aligns the proximate central contact positions of the two front wheels and the off-load side rear wheel on the supporting surface approximately along a straight line which becomes the proximate axis of rotation 38 of the cart as the towbar 22 is used as a lever against the underside of the cart to dump the load. A gravity-produced downward force in the load dumping process is provided by load material that lies on the off-load side of a vertical (imaginary) plane through the axis of rotation 38. Since this force is in the same rotation direction of the cart about the axis of rotation 38 as the force provided by the operator lifting upward on the handle 25, the gravity-produced force effectively reduces the force required by the operator to dump the load. It may also be seen from FIG. 1 and FIG. 2 that in this embodiment and for loads distributed over the load bed 32, the operator can elect to increase the load-produced gravity assistance to the load dumping process by moving the front axle 35 from axle housing 17 to axle housing 31 thereby increasing the distance, at the point of closet approach, between the cylindrical axis of the front axle and the cylindrical axis of the bedframe axle or by moving the rear wheels inward on the rear axle 19 by removing the wheel spacer segments 30, thereby increasing the load material that is on the off-load side of the axis of rotation. Either or both of these cart configuration changes would require the operator to select a different towbar 22 position on the dump alignment device 7 to minimize the force used by the operator on the towbar handle 25 to dump the load.

After dumping a load from the cart, the cart remains in a gravity stable dumped position as illustrated in FIG. 3. The operator may then rotate the cart substantially away from the dumped load by applying a horizontal force on the handle 25 such that the cart is rotated about the surface contact position of the rear wheel 18 on the off-load side of the cart.

To establish the leverage available to the operator for side dumping loads from the cart, the distance of the handle 25 from the contact point of the towbar 22 on the bedframe 40, as seen in FIG. 1, may be made longer or shorter by adjusting the length of the slide bar 24 that extends beyond the towbar 22.

For safe and convenient handling of the cart and for compact storage of the cart, the towbar unit 43 is attached to the lock tabs 27 with the lock-tab pin 29 as seen in FIG. 4. The cart in this configuration can be lifted or rolled on the front two wheels by the operator grasping the handle 25.

Although the descriptions and operations of the invention presented above contains many specificities, these should not be construed as limiting the scope of the invention but as merely providing illustrations of some of the presently preferred embodiments of this invention. For example, load carrying apparatus can have other configurations, such as load beds suitable for liquids. Thus, the scope of the invention should be determined by the appended claims and their legal equivalents, rather than by the example given above.

I claim:

1. A levered gravity assisted side dump cart for transporting loads and for side dumping loads using gravity assistance and manual lever action, comprising:

a) a bedframe with mounting means to support load carrying apparatus, undercarriages, and positioning elements, said bedframe being substantially horizontal in a load transporting position of said cart and structurally providing adequate coupling means to enable said manual lever action and to convey torque forces produced during said manual lever action from the positions of applied lever force on forward elements of said cart to other components of said cart and to cart loads without undue permanent distortion of said bedframe;

b) a load carrying apparatus detachably attached to said bedframe;

c) a rear carriage rearwardly attached to and supporting said bedframe and comprising supporting structures and two load carrying rear wheels movably mounted on a rear axle;

d) a bedframe axle forwardly attached to said bedframe, said bedframe axle having its cylindrical axis substantially vertical in said transporting position of said cart, structurally providing a conveyance means for torque forces produced during said manual lever action to be conveyed to other components of said cart, and providing a positioning means to establish, in part, the extent of gravity assistance that occurs during the side dumping of loads from said cart by the selection of the horizontal position of attachment to said bedframe relative to said rear axle position;

e) a front carriage forwardly supporting said bedframe, having two load carrying front wheels mounted on a front axle, movably attached to said bedframe axle such that the cylindrical axis of said front axle is located at an established proximately constant distance from the cylindrical axis of said bedframe axle at the points of closest approach, and providing rotational and attachment means for moving and steering said cart, for achieving through rotations of said front carriage a compact storage configuration for said cart, and for achieving in part through front wheel alignment positions relative to said rear wheel positions substantially unique dump initiation positions for said cart, said unique dump positions for said cart include those substantially unique rotational positions of said front carriage such that a proximate central contact position of each said front wheel with the supporting surface and a proximate central contact position of said rear wheel with the supporting surface on the selected dumping side of said cart lie approximately on a straight line, said straight line being the proximate axis of rotation of said cart at the initiation of the levered side dumping of loads from said cart by the operator;

f) a towbar unit including a towbar and a handle movably attached to said front carriage, said towbar unit providing means for steering, pushing, and pulling said cart; for levered side dumping of loads from either side of said cart by an operator using said towbar as a lever against underside regions of said cart; for establishing by said towbar length, structural configuration, and position the leverage available for manually dumping loads from said cart; for rotating said front carriage to said substantially unique rotational positions for said cart at which the proximate maximum gravity assistance is obtained and the proximate minimum upward and horizontal forces by the operator on said towbar is required in the side dumping of loads from either side of said cart, and for positioning said towbar in contact with the underside regions of said cart at substantially unique and physically designated positions to establish unique dump initiation positions of said cart; and g) dump alignment devices providing aligning means to establish proximate unique dump initiation locations at which the operator places said towbar in contact with the underside regions of said cart to establish said unique rotational positions of said front carriage to manually side dump said cart with proximate maximum gravity assistance, proximate minimum upward manual force on said towbar unit and proximate zero horizontal force on said towbar unit, said dump alignment device locations being different and proximately uniquely established for different horizontal locations of said rear wheels, of said bedframe axle position relative to said rear axle position, and of said front axle horizontal position relative to said bedframe axle.

2. The side dump cart of claim 1 further including wheel spacer segments on said rear axle providing positioning means for the operator to adjust the horizontal separation between said rear wheels and thereby to influence the extent gravity assistance and the upward force required on said towbar unit in side dumping loads from said cart.

3. The side dump cart of claim 1 further including attachment structures in said front carriage with multiple mounting positions for said front axle providing offsetting means for an operator to select the offset distance, at the point of closet approach, between said front axle relative to the cylindrical axis of said bedframe axle and thus to establish the extent of gravity assistance in side dumping of loads from said cart.

4. The side dump cart of claim 1 further including said loadbed and said front carriage components of said cart providing a gravity stable dumped position of said cart with said rear wheel nearest the dumped load, said two front wheels, and the proximate front corner of said bedframe on the side nearest the dumped load in contact with the support surface, said gravity stable dumped position enabling a motion means to substantially disengage said cart from dumped loads by rotating said cart in said gravity stable dump position around said rear wheel nearest the dumped load by the operator pulling on said towbar unit.

5. The side dump cart of claim 1 further including a towbar lock tab affixed to the underside of said cart providing an attachment means to rigidly constrain the motion of said towbar and said front carriage in a stowed position, to enable said towbar to be locked in said stowed position, and to facilitate the safe manual handling of said cart in said stowed position.

6. The side dump cart of claim 1 further including a slide bar moveably attached between said towbar and said handle providing a positioning means to adjust the leverage available to the operator to dump said cart, to select the height of said handle above the support surface for said cart in said dump initiation position enabling more effective operation of said cart for operators of different heights and to adjust the overall length of said cart in said stowed position for more effective handling, storage, and shipping of said cart.

7. The side dump cart of claim 1 further including said towbar contoured to a non-linear shape to provide positioning means to facilitate rotation of said towbar to positions under said bedframe with only moderate bending and stooping of operators of said cart, to reduce vertical obstruction to operators working around said cart when a portion of said towbar assembly is laying in contact with the support surface for said cart, and to provide a more compact stowed configuration for said cart.

8. The side dump cart of claim 1 further including internally open load constraint receptacles rigidly attached on external surfaces to said bedframe and to a minimum of two proximate mutually orthogonal support elements that are also attached to said bedframe, said receptacles providing an attachment means to removeably attach load poles, sideboards, and other load constraining and load enabling apparatus.

* * * * *